Patented Mar. 15, 1938

2,111,226

UNITED STATES PATENT OFFICE

2,111,226

PROCESS AND COMPOSITION FOR GALVANIZING

Peyton R. Russell, Chagrin Falls, Ohio, assignor, by mesne assignments, to E. I. du Pont de Nemours & Company, Wilmington, Del., a corporation of Delaware No Drawing. Application March 30, 1936, Serial No. 71,700

16 Claims. (Cl. 148—23)

This invention relates to flux compositions and processes for hot dip galvanizing, and is particularly directed to prepared flux compositions and to processes wherein a compound containing a cinchona bark alkaloid nucleus is used as a foaming agent.

In hot dip galvanizing, a bath of molten zinc is covered with a flux. As articles to be galvanized are lowered into the molten zinc bath, they, of course, first pass through the flux where they are cleaned and prepared for the reception of a metal coating.

It has heretofore been the practice to add a material such as glycerine or tallow to the flux on the molten bath in order to produce a foam or froth. This foam serves to entrap vapors and gases, and to retard the rate of volatilization of the flux. In the course of a galvanizing operation, it has been necessary to replace such of the flux as has volatilized, and it has also been necessary to add foam producing material to maintain a foam blanket of the desired thickness and character.

A considerable loss of flux and of foam producing agent resulted from the fact that they were added separately, and at the judgment of the galvanizer. At times there was not enough of the foaming agent present to maintain a foam of proper consistency and thickness, with the result that an excessive amount of flux was lost by volatilization. At other times, and especially immediately following its addition, there was present an excess of poorly mixed foaming material, with the result that some of it was decomposed and charred by the high temperatures of the galvanizing pot. In addition to thus wasting foaming agent, this decomposition and charring resulted in the formation of charred particles which interfere with the galvanizing operation.

It is an object of this invention to provide processes and compositions whereby an optimum foam thickness and consistency are easily maintained, and whereby there is a minimum loss of flux and foaming agent. A further object of my invention is to provide a prepared composition which may be conveniently and easily used. A still further object of my invention is the provision of novel foaming agents of improved character. Other objects will appear hereinafter.

I accomplish my objects by the use of a compound containing a cinchona bark alkaloid nucleus. By mixing such a compound with a predetermined amount of flux, a galvanizer is enabled to add the flux and foaming agent conveniently and in the proportions required to obtain the desired height and consistency of foam. Using such a prepared mixture, there is no excessive loss of flux by volatilization. Moreover, as the flux and foaming agents are intimately mixed and are in the proper proportions, there is but little charring of the foaming agent.

The mixed compositions of my inventions are composed of a foaming agent containing a cinchona bark alkaloid nucleus and a chloride flux selected from the group consisting of zinc chloride, ammonium chloride, and zinc ammonium chloride.

Among the foaming materials contemplated for use in galvanizing according to this invention are the cinchona bark alkaloids themselves. As examples of suitable cinchona bark alkaloids, I may mention quinine, quinodine, cinchonine, and quinoidine. The mode of use of these materials will be discussed in detail hereinafter.

The cinchona bark alkaloids, sometimes termed quinine alkaloids, are very complicated in their chemical character, and their exact molecular configuration is not well understood. It is generally believed that the compounds making up the cinchona bark alkaloids are characterized by the presence of two ternary nitrogen atoms one of which is bonded to two carbon atoms, and the other of which is bonded to three different carbon atoms. The formula ordinarily ascribed to the cinchona bark alkaloids is as follows:

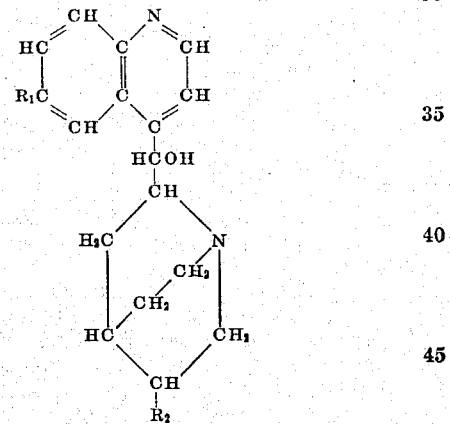

In the above formula, $R_1$ is $OCH_3$ and $R_2$ is —$CH:CH_2$ in quinine. In cinchonine $R_1$ is H, and $R_2$ is —$CH:CH_2$.

It is believed that in the preparation of foaming agents for use according to this invention, the carbon-nitrogen skeleton of the molecules should not be broken. The foaming agents of this invention, accordingly, are herein designated compounds characterized by the presence of a cinchona bark alkaloid nucleus.

A preferred cinchona bark alkaloid, quinoidine, is a by-product of the extraction of medicinal alkaloids from the cinchona bark. Quinoidine is probably a mixture of compounds characterized by the cinchona bark alkaloid nucleus, and foaming agents employing this preferred material will herein be designated compounds containing a quinoidine nucleus.

The cinchona bark alkaloids may be treated with sulfur, with aldehydes, with organic acids, with amines, etc., to produce cinchona bark alkaloid derivatives which are characterized by their efficacy as foaming agents in a galvanizing flux, and by the presence of a cinchona bark alkaloid nucleus.

A foaming agent comprising a compound which contains a cinchona bark alkaloid nucleus may be prepared by sulfurizing a cinchona bark alkaloid. Such compounds are prepared by heating the alkaloids with elemental sulfur, sulfur chloride, or other substances which release sulfur on heating, either directly or in the presence of a catalyst such as aluminum chloride. The following example illustrates the production of a preferred foaming agent which contains a quinoidine nucleus.

*Example I*

Eighty-five parts of quinoidine was melted and 15 parts of powdered sulfur was then stirred into the molten mass with continued heating until a sudden rise in temperature was noted. At this point heating was discontinued. The sudden rise in temperature was accompanied by a vigorous reaction and a copious evolution of hydrogen sulfide. The mass was constantly stirred to prevent excess foaming. The sudden rise in temperature brought the temperature of the reaction mixture up to 135° C., and the mass was kept at this temperature for about fifteen minutes. After cooling, the sulfurized product was a reddish-brown, brittle material which was easily ground to powder.

The amount of sulfur employed for the preparation of sulfurized cinchona bark alkaloids may vary from about five to twenty per cent by weight. Larger or smaller amounts may be used if desired, but the results are not quite as satisfactory.

Sulfurized products may also be produced in a similar manner by the treatment of other cinchona bark alkaloids with powdered sulfur as in the above example, or by the treatment with other sulfurizing agents such as sulfur chloride.

While the structure of the sulfurized compounds is not known, from analogy with the sulfurization of aromatic amines, it can be assumed that the sulfur enters the nuclei by replacement of hydrogen. The sulfurized products, then, are characterized by the presence of a cinchona bark alkaloid nucleus.

Foaming agents which contain a cinchona bark alkaloid nucleus may also be prepared by reacting the cinchona bark alkaloids with carboxylic acids. For the production of such carboxylic acid derivatives of cinchona bark alkaloids, proper amounts of acid and alkaloid are brought together and heated. When carboxylic acids are employed which are liquid at ordinary temperatures, such as formic, acetic, and butyric acids, the acid and alkaloid may be refluxed together, or the cinchona bark alkaloid may be melted and the hot acid added thereto. With acids solid at ordinary temperatures, it is preferable to mix the alkaloid and acid and melt them together. Various other modes of procedure will readily occur to those skilled in the art.

As examples of suitable carboxylic acids, I may mention such acids as acetic, chloracetic, benzoic, citric, formic, lactic, oxalic, salicylic, succinic, tartaric, oleic, linoleic, and stearic acids. Instead of the acids, I may use anhydrides such as acetic or phthalic anhydride.

Widely varying amounts of carboxylic acid may be employed, but in general it is preferable to use between about one-half and two parts by weight of acid to one of cinchona bark alkaloid.

The products obtained by the treatment of cinchona bark alkaloids with carboxylic acids are ordinarily brown, or reddish-brown in color. Their physical state depends upon the specific acid employed and the proportion of acid to alkaloid. The products vary in their physical states from a mobile liquid, such as is obtained by the reaction of formic acid and an equal part of quinoidine, to brittle solids, such as are obtained by the reaction of equal parts of quinoidine with salicylic, citric, oxalic, tartaric, or benzoic acids. When equal parts of chloracetic, lactic, or succinic acids are reacted with quinoidine, a gummy material is produced.

The following example illustrates the preparation of a compound which contains a cinchona bark alkaloid nucleus.

*Example II*

Equal parts by weight of quinoidine and chloracetic acid were heated under a reflux condenser for about one hour. The product was a brown, gummy solid, suitable for use as a foaming agent for galvanizing.

Cinchona bark alkaloid derivatives which contain a cinchona bark alkaloid nucleus may be produced from the above-discussed carboxylic acid derivatives of the cinchona bark alkaloids by the treatment of the latter with sulfur. The carboxylic acid derivatives may be sulfurized in the same manner as the cinchona bark alkaloids of Example I.

The amount of sulfur used in sulfurizing the carboxylic acid derivatives of the cinchona bark alkaloids is preferably about the same as is mentioned above: five to twenty percent. The proportion of sulfur used is based upon the amount of cinchona bark alkaloid used in the preparation of the carboxylic acid derivative.

The following example illustrates the preparation of a compound which contains a cinchona bark alkaloid nucleus.

*Example III*

Equal parts by weight of quinoidine and formic acid were refluxed, producing a reddish-brown, mobile liquid. This liquid was then sulfurized with 5%, by weight, of sulfur. The sulfurized product was a brown, mobile liquid suitable for use as a foaming agent according to my invention. It is noted that the sulfur used was equivalent to 10% by weight, based on the quinoidine.

Instead of preparing foaming agents containing a cinchona bark alkaloid nucleus by the sulfurization of carboxylic acid reaction products of cinchona bark alkaloids, the sulfurized cinchona bark alkaloids may be treated with carboxylic acids. In the preparation of the cinchona bark alkaloids of this type, the carboxylic acids, or their anhydrides as mentioned above, may be reacted with a sulfurized cinchona bark alkaloid. The products obtained are ordinarily more liquid than the corresponding products produced by reacting the cinchona bark alkaloids first with carboxylic acids and then with sulfur.

The sulfurized carboxylic acid reaction products with cinchona bark alkaloids are usually darker in color and lack the red shade noted in the products obtained by the reaction of carboxylic acids on sulfurized cinchona bark alkaloids. As an example of the difference in these products, it is noted, for instance, that when quinoidine is treated with acetic acid and then sulfurized, a brittle solid is obtained, while the action of acetic acid on sulfurized quinoidine results in a thick liquid product.

The following example illustrates this modified procedure.

Example IV

One part of sulfurized quinoidine prepared as in Example I was mixed with one part, by weight, of salicylic acid. The mixture was heated under a reflux for about two hours. The product was a brown, brittle solid, suitable for use as a foaming agent for galvanizing.

Another group of foaming agents which contain a cinchona bark alkaloid nucleus is produced by the treatment of a cinchona bark alkaloid with an aldehyde or ketone. I may use any cinchona bark alkaloid as a starting material, but, as in the foregoing, it is preferred to use quinoidine.

Aldehydes and ketones, of course, are characterized by the presence of the carbonyl group

in which R is an organic radical, and R' is hydrogen in the case of an aldehyde, or R' is an organic radical in the case of a ketone. The carbonyl group as found in aldehydes and ketones has been designated a ketaldonyl group to distinguish from the carbonyl group present in organic acids. Aldehydes and ketones, likewise, have been designated ketaldones in view of their numerous similarities.

For the production of foaming agents comprising compounds which contain a cinchona bark alkaloid nucleus, I may use any suitable ketaldone such as acetone, isoamylketone, methyl-ethyl ketone, cyclohexanone, methyl-cyclohexanone, light acetone oil, acetaldehyde, aldol, anisic aldehyde, benzaldehyde, butaldehyde, crotonaldehyde, and furfural.

The following example illustrates the production of a compound characterized by the presence of a cinchona bark alkaloid nucleus from a cinchona bark alkaloid and a ketaldone.

Example V

Five parts by weight of quinoidine was mixed with two parts by weight of benzaldehyde and the mixture was heated in a reflux condenser for about two hours. The product thus obtained was a soft solid, fairly soluble in water. This product may, if desired, be dried before use, but it is ordinarily undesirable to do so. Upon drying the product, about forty per cent of its weight was lost. This loss of weight seems to indicate that all of the benzaldehyde was driven off, and that the compound was broken down to the original quinoidine. The dried product, however, was different from quinoidine in its physical and chemical properties.

The proportion of ketaldone to cinchona bark alkaloid may be widely varied. In the above example the proportion of benzaldehyde to quinoidine is preferably from about one to five parts of benzaldehyde for each five parts of quinoidine, but larger or smaller amounts of benzaldehyde may be used if desired.

When two parts of ketaldone for each five parts of quinoidine, for instance, are used, excellent products are obtained. The reaction products, before drying, are usually thick liquids or soft solids, tho with aldol a fairly hard solid is obtained. If these products are dried, powdered materials may be obtained which vary in color from a light brown to a dark brown. The products obtained using butaldehyde and methylcyclohexanone were each reddish-brown powders, and when light acetone oil was employed, the dried product was a dark brown gum.

When a ketaldone and quinoidine were employed in equal amounts, the products obtained were all liquids. Upon drying, all of the products were powders which varied in color from a light brown to brown. Using furfural a dark brown powder was obtained, and with butaldehyde a reddish-brown powder was obtained.

By the treatment of sulfurized cinchona bark alkaloids with ketaldones, I may obtain foaming agents according to my invention which comprise compounds that contain a cinchona bark alkaloid nucleus. To produce products of this type, cinchona bark alkaloids which have been sulfurized according to the procedure of Example I may be treated with ketaldones according to the procedure of Example V.

When two parts of ketaldone for each five parts of quinoidine, for instance, is used, excellent products are obtained. The reaction products, before drying, are usually thick liquids or soft solids, tho with aldol a fairly hard solid is obtained. If these products are dried, powdered materials may be obtained which vary in color from a light brown to a dark brown. The products obtained using butaldehyde and methylcyclohexanone were each reddish-brown powders, and when light acetone oil was employed, the dried product was a dark brown gum.

When a ketaldone and quinoidine were employed in equal amounts, the products obtained were all liquids. Upon drying, all of the products were powders which varied in color from a light brown to brown in color. Using furfural a dark brown powder was obtained, and with butaldehyde a reddish-brown powder was obtained.

By the treatment of sulfurized cinchona bark alkaloids with ketaldones, I may obtain foaming agents according to my invention which comprise compounds that contain a cinchona bark alkaloid nucleus. To produce products of this type, cinchona bark alkaloids which have been sulfurized according to the procedure of Example I may be treated with ketaldones according to the procedure of Example V.

The following example is given to illustrate the production of ketaldone reaction products with sulfurized cinchona bark alkaloids.

Example VI

Eighty-five parts of quinoidine was melted and 15 parts of sulfur added thereto. After reaction the product was allowed to cool. To five parts of the sulfurized quinoidine thus produced, five parts of benzaldehyde was added and the mixture refluxed for about two hours. The product thus obtained was a thick, dark liquid. This product may be dried, if desired, tho it is not ordinarily desirable to do so. Upon drying the product, a brown, non-caking powder was obtained.

The proportions of sulfur to quinoidine, and the proportions of benzaldehyde to sulfurized quinoidine may be widely varied, tho preferably they are selected according to the considerations above discussed.

While the above example relates specifically to the use of elemental sulfur, quinoidine, and benzaldehyde, it will readily be apparent that other suitable sulfurizing agents may be used, that other suitable cinchona bark alkaloids may be used, and that other ketaldones may be used. When sulfurized quinoidine was reacted with an equal amount of acetone, a dark mobile liquid was obtained. With furfural a thick, dark liquid was obtained.

Foaming agents characterized by the presence of a cinchona bark alkaloid nucleus may also be prepared by reacting a cinchona bark alkaloid with a hydrocarbon, a hydrogen of which is substituted by an acid group. Representing the complex structural formula above given in a simplified manner, this group of foaming agents may be represented as follows:

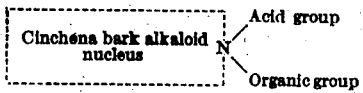

It will be observed that in this formula nitrogen is represented because it is believed that the compounds of this character are prepared by the reaction with one or more of the nitrogens in the nucleus.

When the cinchona bark alkaloid nucleus is reacted with a hydrocarbon having an acid radical substituted for one hydrogen, I believe that the acid radical adds on to a nitrogen, and the organic group also adds on, thus producing a quaternary compound. The addition may take place at either nitrogen, or, as there are two nitrogen atoms, two molecules of alkyl halide or the like may react with one molecule of cinchona bark alkaloid. While the organic group is preferably a hydrocarbon group, as above explained, it may be another alkyl or alkoxy group or it may be an aralkyl or aryl group.

When a nitrogen of a cinchona bark alkaloid has added thereto an acid group and an organic group, the resulting compound is a quaternary ammonium compound. That is to say, it may be regarded as a derivative of ammonium hydroxide wherein the hydroxyl group and the hydrogen atoms have all been replaced. When such a quaternary compound is prepared using quinoidine, it may, by analogy with pyridinium compounds, be termed a quinoidinium compound.

Inhibitors of the formula:

are preferably made by reacting a cinchona bark alkaloid with a hydrocarbon, a hydrogen of which is substituted by an acid radical. The cinchona bark alkaloids may be reacted, for instance, with benzyl chloride, benzyl bromide, benzyl thiocyanate, and the like. As further examples of materials to react with cinchona bark alkaloids to produce foaming agents according to this invention, there may be mentioned chlorides produced from higher aliphatic alcohols. Crude octyl chloride, for instance, may be produced admixed with other chlorides from a commercial mixture of aliphatic alcohols containing from six to ten carbon atoms, octyl alcohol being present in major proportions, and a similar halide, crude dodecyl chloride, may be prepared from crude dodecyl alcohol, the crude material containing alcohols ranging from eight to fourteen carbon atoms.

Foaming agents of the formula:

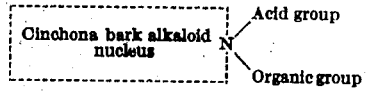

may also be prepared by reacting a cinchona bark alkaloid with such compounds as benzoyl chloride, benzoyl thiocyanate, dichloro-diethyl ether, dialkyl sulfates such as dimethyl sulfate, alkyl sulfonates such as lauryl para-toluene sulfonate, dihalogen alkyl compounds such as ethylene sulfonate, and the like. Other acid radicals than those listed above may, of course, be used if desired.

The cinchona bark alkaloid nucleus may be modified in various ways providing that the molecular configuration remains substantially unchanged. That is, the modification should not alter the carbon-nitrogen ring structure. For instance, the cinchona bark alkaloids may be sulfurized before their treatment with chlorides and the like. Such modification of the nucleus may also be made after the reaction of the cinchona bark alkaloids with chlorides and the like.

The following example is given to illustrate the manner of production of compounds of this type.

*Example VII*

An inhibitor of the formula:

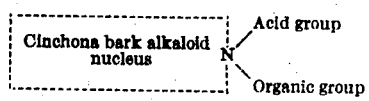

was prepared by refluxing equimolecular proportions of quinoidine and crude dodecyl chloride for three hours. For purposes of determining the proportions of reactants, quinoidine was considered as having the same molecular weight as quinine. Specifically, there was used 64.8 parts of quinoidine and 45.7 parts of crude dodecyl chloride by weight. The alkyl quinoidinium chloride thus prepared was a dark-colored solid soluble in ethyl alcohol. This product was suitable as a foaming agent for use in galvanizing.

*Example VIII*

A foaming agent of the formula:

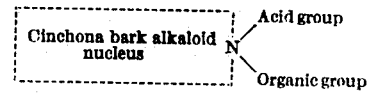

was prepared by adding 16 parts by weight of benzoyl chloride to 20 parts by weight of finely ground sulfurized quinoidine. After the benzoyl chloride soaked through the sulfurized quinoidine, the mixture was heated gently until it became plastic and began to bubble. The mixture was allowed to cool and the product was a hard, brittle, black vitreous mass with a glistening fracture. After a few days the product became slightly softer. The product obtained was suitable for use as a foaming agent for galvanizing.

Foaming agents characterized by the presence of a cinchona bark alkaloid nucleus may also be prepared by the treatment of a cinchona bark alkaloid with a thiuram sulfide. Thiuram sulfides are chemical compounds of the general formula R₂N—CS—(S)ₓ—CS—NR₂ in which R represents hydrogen or a hydrocarbon radical and x stands for a small whole number. Among the most satisfactory thiuram sulfides are the tetra-alkyl-thiuram disulfides and the tetra-alkyl-thiuram monosulfides. Specifically, I may mention as examples tetra-methyl-thiuram disulfide and tetra-methyl-thiuram monosulfide.

In order to prepare products of this type, quinoidine is melted, and a thiuram sulfide is added and stirrred into the molten bath. Heating of the mass is continued until a temperature somewhat in excess of about 100° C. is reached. The products thus produced, generally, are amorphous, resinous products of yellowish to brown color.

Following the procedure above discussed, a typical foaming agent was prepared, as in the following.

Example IX

Ninety parts of quinoidine by weight was heated to 140° C. and 10 parts by weight of tetra-methyl-thiuram disulfide was stirred into the molten mass. After the reaction was complete, a resinous product suitable for use as a foaming agent for galvanizing was obtained.

The amount of thiuram sulfide employed may be widely varied, but I generally prefer to use from about one to nine parts by weight of thiuram sulfide to each nine parts of cinchona bark alkaloid. More specifically, it is preferred to use about one part of thiuram sulfide for each three parts of cinchona bark alkaloid.

In the preparation of compositions of this type, the thiuram sulfides may be replaced by dithiocarbamates from which the thiuram sulfides are produced by oxidation. Substantially the same products seem to be produced, and it is assumed that under the conditions of the reaction the thiuram sulfides are formed at an intermediate stage and then react with the alkaloid.

Foaming agents characterized by the presence of a cinchona bark alkaloid nucleus may be produced also by the treatment of cinchona bark alkaloids with aldehydeamines. Aldehydeamines have been produced from various aliphatic and aromatic amines condensed with aliphatic or aromatic aldehydes. They are known in various molecular ratios of aldehyde to amine. Products of this type may be produced by mixing a cinchona bark alkaloid with an aldehyde amine, and heating the mixture to a temperature above about 100° C. when an exothermic reaction takes place. The temperature is maintained for a short time and the product cooled.

Example X

Following the above procedure, 3 parts by weight of quinoidine was reacted with 1 part by weight of acetaldehyde aniline. The product obtained was suitable for use as a foaming agent for galvanizing.

The proportions of reactants may be widely varied, tho generally I prefer to use from about one to nine parts of an aldehydeamine to each nine parts of cinchona bark alkaloid.

It will be understood that the exact molecular configurations of the cinchona bark alkaloids and their derivatives are not known, and I do not intend to be in any way limited by the theory and terminology herein adopted for purposes of illustration and definition.

The forming agents above discussed may advantageously be mixed with a galvanizing flux to produce a prepared composition of the character above described. The following examples illustrate a typical mode of use of a few of the above described products.

Example XI

A prepared flux was made up by intimately mixing 0.2% of quinoidine with a zinc ammonium chloride flux (44% ZnCl₂ and 56% NH₄Cl). This composition was used by adding some of it directly to a galvanizing pot containing molten zinc. An excellent foam blanket which lasted about twenty-two minutes and which was about five inches thick was obtained. The foam blanket was easily maintained by adding more of the composition as required.

Example XII

A similar flux composition was prepared using 0.35% of sulfurized quinoidine, produced according to the procedure of Example I, and a zinc ammonium chloride flux. A foam seven inches thick which lasted about thirty-eight minutes was obtained.

Example XIII

A prepared flux composition was made up using 0.6% of a product produced as in Example V by reacting equal weights of quinoidine and acetaldehyde. There was obtained a foam blanket a little over seven inches thick and which lasted for about forty-two minutes.

A similar composition was prepared by adding to a zinc ammonium chloride flux two per cent of a reaction product of equal weights of quinoidine and light acetone oil prepared according to the procedure of Example V. By the use of this composition there was obtained a foam blanket a little over seven inches thick which lasted for about sixty-four minutes.

Example XIV

To a zinc ammonium chloride flux there was added two per cent of a reaction product of equal weights of quinoidine and aldol produced according to the procedure of the above Example V. With this preparation there was obtained a foam blanket a little over four inches thick which lasted for sixty-eight minutes.

Example XV

A prepared flux composition was made up by adding to a zinc ammonium chloride flux 0.6% of a product prepared as in the above Example VII by reacting quinoidine with the chloride of a commercial mixture of higher primary aliphatic alcohols. The alcohols are those referred to in the above Example VII, the mixture containing alcohols from about eight to fourteen carbon atoms, but being composed principally of dodecyl alcohol. By the use of this composition on a molten zinc bath, there was obtained a foam blanket almost three inches thick which lasted for about thirty minutes.

Example XVI

A prepared composition was made up as in Example XV but using a reaction product of quinoide and crude octyl chloride. One per cent of the octyl quinoidinium chloride was mixed with a zinc ammonium chloride flux, and when this composition was used on a molten zinc bath, there was obtained a foam blanket about eight inches thick which lasted for about fifty-six minutes.

Example XVII

To a zinc ammonium chloride flux there was added one per cent by weight of benzyl quinoidinium chloride produced as in the above Example VII. Using this composition on a molten zinc bath, there was obtained a form about six inches thick which lasted for about forty-six minutes.

The compounds which contain a cinchona bark alkaloid nucleus according to this invention may, of course, be employed in widely varying amounts, the preferred quantity varying with different conditions of use. When a prepared composition is to be employed in a basket-process or in a process of similar type, it is desirable to maintain a thick, heavy foam. A composition for this purpose would contain a relatively large amount of foaming agent, say from 0.4 to 2.0%.

However, in the so-called hook-process in which articles are suspended from hooks when lowered into the bath, it is necessary to use a somewhat lighter and thinner foam as otherwise the article will not penetrate the foam but will float off the hooks and become detached. For this type of process, the flux composition should contain a somewhat smaller amount of foaming agent, say from about 0.1 to 1.0%.

While I have discussed the use of the foaming agents of my invention with particular reference to prepared compositions, it will be understood that the foaming agents may be added separately to the bath. It will also be understood that while the invention is particularly adapted to hot dip galvanizing, it may advantageously be applied to other hot dip processes. It may, for instance, be applied to processes of hot dip coating which use molten baths of tin, lead, or cadmium.

While I have disclosed certain specific compositions in the foregoing, it will be understood that I do not intend to be limited thereby, and one skilled in the art may readily produce numerous other compounds which are characterized by the presence of a quinoidine nucleus, or, more broadly, of a cinchona bark alkaloid nucleus, without departing from the spirit of my invention.

I claim:

1. A prepared foaming flux composition for use on a bath of molten metal comprising a chloride flux selected from the group consisting of zinc chloride, ammonium chloride, and zinc-ammonium chloride and a foaming agent which contains a cinchona bark alkaloid nucleus.

2. A prepared foaming flux composition for use on a bath of molten metal comprising a chloride flux selected from the group consisting of zinc chloride, ammonium chloride, and zinc-ammonium chloride and a foaming agent which contains a quinoidine nucleus.

3. A prepared foaming flux composition for use on a bath of molten metal comprising a chloride flux selected from the group consisting of zinc chloride, ammonium chloride, and zinc ammonium chloride and a cinchona bark alkaloid.

4. A prepared foaming flux composition for use on a bath of molten metal comprising a chloride flux selected from the group consisting of zinc chloride, ammonium chloride, and zinc-ammonium chloride and quinoidine.

5. A prepared foaming flux composition for use on a bath of molten metal comprising a chloride flux selected from the group consisting of zinc chloride, ammonium chloride, and zinc-ammonium chloride and a sulfurized cinchona bark alkaloid.

6. A prepared foaming flux composition for use on a bath of molten metal comprising a chloride flux selected from the group consisting of zinc chloride, ammonium chloride, and zinc-ammonium chloride and sulfurized quinoidine.

7. A prepared foaming flux composition for use on a bath of molten metal comprising a chloride flux selected from the group consisting of zinc chloride, ammonium chloride, and zinc-ammonium chloride and a reaction product of a cinchona bark alkaloid with a ketaldone.

8. A prepared foaming flux composition for use on a bath of molten metal comprising a chloride flux selected from the group consisting of zinc chloride, ammonium chloride, and zinc-ammonium chloride and the reaction product of quinoidine with a ketaldone.

9. In a process for the hot dip coating of metals, the step comprising producing a foam by the addition to the galvanizing flux of a foaming agent which contains a cinchona bark alkaloid nucleus.

10. In a process for the hot dip coating of metals, the step comprising producing a foam by the addition to the galvanizing flux of a foaming agent containing a quinoidine nucleus.

11. In a process for the hot dip coating of metals, the step comprising producing a foam by the addition to the galvanizing flux of a cinchona bark alkaloid.

12. In a process for the hot dip coating of metals, the step comprising producing a foam by the addition to the galvanizing flux of quinoidine.

13. In a process for the hot dip coating of metals, the step comprising producing a foam by the addition to the galvanizing flux of a sulfurized cinchona bark alkaloid.

14. In a process for the hot dip coating of metals, the step comprising producing a foam by the addition to the galvanizing flux of sulfurized quinoidine.

15. In a process for the hot dip coating of metals, the step comprising producing a foam by the addition to the galvanizing flux of a reaction product of a cinchona bark alkaloid and a ketaldone.

16. In a process for the hot dip coating of metals, the step comprising producing a foam by the addition to the galvanizing flux of a reaction product of quinoidine and a ketaldone.

PEYTON R. RUSSELL.